United States Patent [19]

Krukowski

[11] Patent Number: 4,765,315

[45] Date of Patent: Aug. 23, 1988

[54] PARTICLE BRAKE CLUTCH MUSCLE EXERCISE AND REHABILITATION APPARATUS

[75] Inventor: Richard Krukowski, Chatham, N.J.

[73] Assignee: Biodex Corporation, Shirley, N.Y.

[21] Appl. No.: 59,392

[22] Filed: Jun. 8, 1987

Related U.S. Application Data

[63] Continuation-in-part of Ser. No. 907,392, Sep. 15, 1986, Pat. No. 4,691,694, which is a continuation-in-part of Ser. No. 676,493, Nov. 29, 1984, Pat. No. 4,628,910.

[51] Int. Cl.⁴ .............................................. A63B 23/00
[52] U.S. Cl. .................................. 128/25 R; 272/125; 272/129
[58] Field of Search ............... 272/125, 129, 130, 132, 272/134, 144; 128/25 R

[56] References Cited

U.S. PATENT DOCUMENTS

| | | |
|---|---|---|
| 4,569,518 | 2/1986 | Fulks . |
| 4,570,927 | 2/1986 | Petrofsky et al. . |
| 4,577,862 | 3/1986 | Sagedahl . |
| 4,609,190 | 9/1986 | Brentham . |
| 4,613,129 | 9/1986 | Schroeder et al. . |
| 4,620,703 | 11/1986 | Greenhut . |
| 4,625,962 | 12/1986 | Street . |
| 4,674,741 | 6/1987 | Pasierb, Jr. et al. ................ 272/132 |
| 4,676,501 | 6/1987 | Hoagland et al. . |
| 4,678,182 | 7/1987 | Nakao et al. . |
| 4,678,184 | 7/1987 | Neiger et al. . |
| 4,702,108 | 10/1987 | Amundsen et al. . |
| 4,705,271 | 11/1987 | Mondloch et al. . |
| 4,709,917 | 12/1987 | Yang . |
| 4,711,450 | 12/1987 | McCarthur . |

*Primary Examiner*—Leo P. Picard
*Attorney, Agent, or Firm*—Cobrin, Feingertz & Godsberg

[57] ABSTRACT

A muscle exercise and rehabilitation apparatus includes a movable fixture against which an actuating force can be applied; a particle brake clutch for applying a braking force to the fixture in linear dependence on a braking current supplied thereto, in counteracting relation to the actuating force; a control circuit for controlling the supply of braking current to the particle brake clutch so that the latter controls the fixture to move in at least one of an isometric, isotonic and isokinetic mode of operation; and a hysteresis compensating circuit for supplying a reverse current to the particle brake clutch to cancel out hysteresis in the particle brake clutch in dependence on the amount of braking current previously supplied to the particle brake clutch.

27 Claims, 2 Drawing Sheets

PARTICLE BRAKE CLUTCH MUSCLE EXERCISE AND REHABILITATION APPARATUS

REFERENCE TO RELATED APPLICATIONS

The present application is a continuation-in-part of commonly assigned, copending U.S. patent application Ser. No. 06/907,392, filed Sept. 15, 1986, entitled Muscle Exercise and Rehabilitation Apparatus, by Richard Krukowski, Daniel Y. Gezari and Robert L. Boyd now U.S. Pat. No. 4,691,694, which in turn, is a continuation-in-part of commonly assigned, copending U.S. patent application Ser. No. 06/676,493, filed Nov. 29, 1984, entitled Muscle Exercise and Rehabilitation Apparatus, by Richard Krukowski, now U.S. Pat. No. 4,628,910, issued Dec. 16, 1986, the entire disclosures of both being incorporated herein by reference.

BACKGROUND OF THE INVENTION

This invention relates generally to exercise and rehabilitation apparatus and, more particularly, is directed to exercise and rehabilitation apparatus operative in isokinetic, isotonic, and isometric modes.

Various exercising machines, such as those designated by "Universal", "Nautilus", "Cybex" and "Kin/Com", are well known in the art.

One of the first of these machines was the "Universal" exercising machine which uses a pulley-weight system, whereby the weights added to the pulley system can be varied by the user. With such apparatus, however, there are no controls over the manner, that is, the speed of movement and the torque applied by the user, in overcoming the weight load. It is only necessary that the user apply a force that is greater than the weight load through the pulley system. As such, the "Universal" apparatus is similar to a free weight system.

The "Nautilus" apparatus was developed to overcome some of the deficiencies of the "Universal" machine by providing a fixed path of movement of the respective arms thereof so that the latter follow respective paths designed for better muscle isolation during exercise. The "Nautilus" apparatus, rather than using a pulley-weight system, uses a novel cam arrangement. However, as with the "Universal" machine, the "Nautilus" apparatus does not control the speed of movement or resistive torque applied to the arm.

The "Cybex" apparatus, as exemplified in U.S. Pat. No. 3,465,592, recognized that the muscle is not equally powerful throughout its entire range of motion. The "Cybex" apparatus provides a motor connected through a gearing system to regulate the exercise arm of the machine so that it travels with a constant velocity, thereby taking into account the different strengths of the muscle during different angular extensions thereof.

Although the "Cybex" apparatus provides distinct advantages over the aforementioned "Universal" and "Nautilus" apparatus, the "Cybex" apparatus fails to provide necessary functions for truly accurate and corrective exercise and rehabilitation. In this regard, the "Cybex" apparatus uses a motor with two clutches. The arm of the apparatus is movable freely until the planetary speed of the gearing therein is reached, whereupon a resistive force is met by the user. Further, the "Cybex" apparatus uses a complicated hydraulic network to read the resistive forces.

U.S. Pat. No. 4,235,437 discloses a robotic exercise machine which uses a computer to regulate the motion of an exercise arm in response to software programmed into the machine and in response to the force applied to the arm by the user as detected by a strain gauge at the end of the arm. By means of hydraulic cylinders and solenoid controlled valves, movement of the arm can be accurately controlled. However, the equipment provided in U.S. Pat. No. 4,235,437 is relatively complicated and requires expensive computer equipment and a complex linkage system. Further, because the equipment is computer controlled, the user must spend some time programming the computer with the desired settings before exercising. This, of course, is time consuming and detracts from the exercising.

There is also known a muscle exercise and rehabilitation apparatus sold by Chattecx Corporation of Chattanooga, Tenn. under the same "Kin/Com" which provides a computer controlled hydraulic system that monitors and measures velocities, angles and forces during muscular contractions. A load cell is provided to measure the force at the point of application, with an accuracy of 4 ounces. However, this apparatus, being computer controlled, suffers from the same problems discussed above with respect to U.S. Pat. No. 4,235,437.

U.S. Pat. No. 3,744,480 discloses an ergometer which includes a pedal driven DC motor as a load, including a frame for supporting the body of a person, whereby the pedals may be operated by either the feet or hands, and the electrical circuitry of the ergometer limits the load applied to the pedals as a function of work being performed, heart rate and increases in heart rate. However, with this Patent, a servo motor is used, which results in a complex and expensive circuit. Further, with the dynamic braking of this patent, such dynamic braking is not a linear function. As a result, it is difficult to accurately control the movement of the arm.

U.S. Pat. Nos. 3,848,467 and 3,869,121 each disclose an exercise machine in which a user applies a force to an arm which is coupled to a drive shaft, the latter being driven by a servo motor through a speed reducer. A brake is connected to the servo motor through the speed reducer, although in the embodiment of FIG. 3, a permanent magnet servo motor is used as both the powering means and the brake. A speed and direction sensor is connected with the drive shaft, the servo motor or the speed reducer, and supplies a signal to a comparator, corresponding to the direction and speed of the arm. Another input of the comparator is supplied with a signal from a speed and direction programmer, corresponding to a desired speed and direction of movement of the arm. The comparator controls the powering means and the brake in response to these signals to regulate the system speed, responsive to varying exercises force applied to the arm during both concentric and eccentric muscular contractions. With these latter Patents, however, the circuitry is again complicated and expensive due to the use of a servo motor.

U.S. Pat. No. 4,184,678, although somewhat more sophisticated than the above two Patents, operates in the same general manner.

In order to overcome the above problems with the prior art, there is disclosed in copending U.S. Pat. No. 4,628,910, the entire disclosure of which is incorporated herein by reference, a muscle exercise and rehabilitation apparatus in which the servo motor is used to move the arm at all times.

Specifically, as disclosed therein, in the concentric isokinetic mode of operation, the arm is controlled to move with a regulated velocity in the direction of force applied by the user, for both flexion (bending) and extension (unbending) of the limb. For example, in a knee extension/flexion operation, where a cuff at the end of the arm is brought from a vertical to a horizontal position of the user, the servo motor which controls movement of the arm, is driven at a velocity dependent upon the force applied by the user, and in the same direction as the applied force, until a predetermined clamp velocity is reached. Once the predetermined clamp or set velocity is reached, the servo motor drives the arm at a predetermined constant velocity, whereby the arm moves with a constant velocity in the direction of force applied by the user. Thus, if the force applied by the user is too great, that is, will normally drive the arm at a velocity greater than the clamp velocity, the servo motor only drives and/or allows the arm to move at the predetermined clamp velocity. If the user stops applying the force, the arm will stop moving.

During the return movement, where the cuff is brought from the horizontal position to the lower vertical position, during flexion, the user must apply a force in the downward directio in order for the cuff to be moved downwardly. The servo motor moves the arm and the cuff, initially at a velocity dependent upon the downward force applied by the user. Once the velocity reaches a predetermined clamp velocity, the servo motor drives the arm at the predetermined velocity, whereby the arm moves with a constant velocity in the direction of force applied by the user. As with extension, if the user stops applying the force, the arm will cease moving with a constant velocity and come to a full stop.

Thus, with such apparatus, for flexion and extension, the servo motor drives the arm. The user does not move the arm but merely provides a measured force by which the servo motor is controlled.

In the eccentric isokinetic mode of operation, the arm is controlled to move with a regulated velocity in the direction opposite to the direction of force applied by the user, for both flexion and extension of the limb. In one embodiment, the range of speeds is much smaller than that in the concentric isokinetic mode in order to prevent harm to the user. However, again, for both flexion and extension, the servo motor drives the arm.

In the passive or oscillation mode, the arm is caused to oscillate by the servo motor at a constant speed, regardless of the force applied by the user. If there is a force applied by the user, regardless of the direction of such force (either concentric or eccentric), which would cause the arm to change its speed of oscillation, the servo motor controls the arm to maintain the constant speed.

In all of the above modes, it is the servo motor which moves the arm in response to the sensed velocity and/or predetermined force applied to the arm. The user does not move the arm. Because the servo motor is used to move the arm at all times, movement of the arm can be linearly controlled in response to the force applied thereto for forces within the range of 0-400 foot-pounds.

With such apparatus, circuitry is provided for limiting the angular range of motion of the arm. Specifically, for each direction, an amplifier receives a signal from a position sensor corresponding to the angular position, and a signal from a potentiometer corresponding to a preset angular limit. When the angular limit is reached, the amplifier provides an appropriate signal to a PWM amplifier which, in turn, controls the servo motor to prevent the arm from exceeding its set angular limit. The limit voltage for each direction is set by a push button the user presets to attain a desired angular limit.

This apparatus, however, also requires the use of a servo motor, and therefore provides complicated and expensive circuitry.

Other apparatus of a similar and analogous nature are found in the following U.S. Pat. Nos.: 2,784,591; 3,301,553; 3,374,675; 3,465,592; 3,505,992; 3,511,097; 3,580,244; 3,705,721; 3,767,195; 3,784,194; 3,822,599; 3,859,840; 3,902,480; 4,326,707; 4,333,340; 4,337,050; 4,354,676; 4,407,496; 4,479,647; 4,492,222; 4,544,154; 4,549,534; 4,601,468.

The use of powdered metal or particle brake clutches in industrial applications, such as in apparatus for producing paper and plastics, printing, rubber, textiles, wire, food/beverage process equipment, automotive process equipment, material handling, metal fabricating and packaging equipment, is well known. With such clutches, torque is transmitted through magnetic particle chains formed by an electromagnetic field. Specifically, magnetic particles are placed within an electromagnetic coil. When current is applied to the coil, the magnetic particles link together. The greater the current, the more tightly the magnetic particles link together. As a result, the linked particles can be used to bond an input shaft to an output shaft where the particles lay loosely between the two shafts. In use, the output of the clutch torque, that is, the amount of linking, is directly proportional to the input current. Such clutches, however, have generally only been used to control an output shaft driven by a constant speed motor, or the like in industrial applications.

OBJECTS AND SUMMARY OF THE INVENTION

Accordingly, it is an object of the present invention to provide a muscle exercise and rehabilitation apparatus that overcomes the aforementioned problems.

It is another object of the present invention to provide a muscle exercise and rehabilitation apparatus that can be used as a dynamometer or ergometer.

It is still another object of the present invention to provide a muscle exercise and rehabilitation apparatus that can be used in an isometric, isokinetic or isotonic mode of operation.

It is yet another object of the present invention to provide a muscle exercise and rehabilitation apparatus that uses a particle brake clutch to provide controlled resistance to a fixture to be moved by a person.

It is a further object of the present invention to provide a muscle exercise and rehabilitation apparatus that provides a linear braking operation, whereby accurate braking control can be achieved even at small loads.

It is a still further object of the present invention to provide a muscle exercise and rehabilitation apparatus that controls the resisting torque on a fixture in direct proportion to supplied current.

It is a yet further object of the present invention to provide a muscle exercise and rehabilitation apparatus that can linearly control the resisting torque on a fixture from zero to maximum torque.

It is another object of the present invention to provide a muscle exercise and rehabilitation apparatus that uses a particle brake clutch, and has means for compensating hysteresis therein.

It is still another object of the present invention to provide a muscle exercise and rehabilitation apparatus that is relatively easy and economical to manufacture and use.

In accordance with an aspect of the present invention, a muscle exercise and rehabilitation apparatus includes movable fixture means against which an actuating force can be applied; particle brake clutch means for applying a braking force to the fixture means in linear dependence on current supplied thereto, in counteracting relation to the actuating force; and control means for controlling the supply of current to the particle brake clutch means so that the latter controls the fixture means to move in at least one of an isometric, isotonic and isokinetic mode of operation.

In accordance with another aspect of the present invention, a muscle exercise and rehabilitation apparatus includes movable fixture means against which an actuating force can be applied; particle brake clutch means for applying a braking force to the fixture means in linear dependence on a braking current supplied thereto, in counteracting relation to the actuating force; control means for controlling the supply of braking current to the particle brake clutch means so that the latter controls the fixture means to move in at least one of an isometric, isotonic and isokinetic mode of operation; and hysteresis compensating means for supplying a reverse current to the particle brake clutch means to cancel out hysteresis in the particle brake clutch means in dependence on the amount of braking current previously supplied to the particle brake clutch means.

In accordance with still another aspect of the present invention, a muscle exercise and rehabilitation apparatus includes movable fixture means against which an actuating force can be applied; particle brake clutch means for applying a braking force to the fixture means in linear dependence on a braking current supplied thereto, in counteracting relation to the actuating force; control means for controlling the supply of braking current to the particle brake clutch means so that the latter controls the fixture means to move in at least one of an isometric, isotonic and isokinetic mode of operation, the control means including torque control means for producing an input torque signal corresponding to a desired constant braking force applied to the fixture means by the particle brake clutch means, speed control means means for producing an input speed signal corresponding to a desired constant speed of movement of the fixture means, isometric control means means for producing a high voltage signal, current regulating means for controlling current supplied to the particle brake clutch means in dependence on the mode switch means and in response to one of the input torque signal to control the particle brake clutch means to apply a constant braking force to the fixture means, the input speed signal to control the particle brake clutch means to prevent movement of the fixture means at a speed greater than the desired constant speed, the high voltage signal to control the particle brake clutch means to prevent movement of the fixture means; mode switch means for controlling the control means to select operation of the apparatus in one of the isometric, isotonic and isokinetic mode of operation; range of motion limit means for limiting movement of the fixture means between first and second limits; and hysteresis compensating means for supplying a reverse current to the particle brake clutch means to cancel out hysteresis in the particle brake clutch means in dependence on the amount of braking current previously supplied to the particle brake clutch means.

The above and other objects, features and advantages of the present invention will become readily apparent from the following detailed description which is to be read in connection with the accompanying drawings.

BRIEF DESCRIPTION OF THE DRAWINGS

FIG. 3 is a plan view of a control panel on a control box of the apparatus of FIG. 1.

DETAILED DESCRIPTION OF A PREFERRED EMBODIMENT

Figure 1:
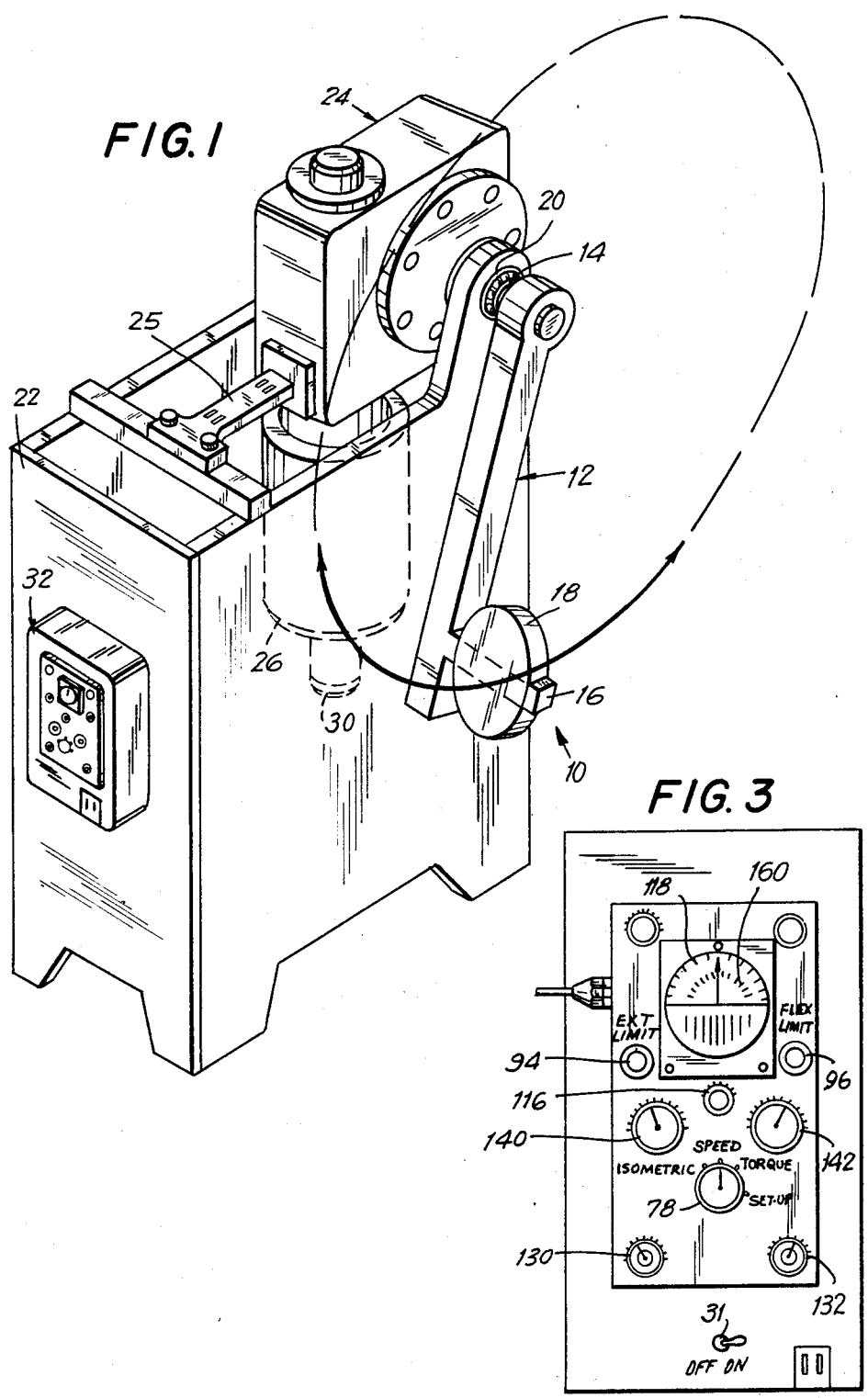
FIG. 1 is a perspective view of a muscle exercise and rehabilitation apparatus according to one embodiment of the present invention.

Referring to the drawings in detail, and initially to FIG. 1 thereof, apparatus 10 according to one embodiment of the present invention includes a fixture 12 having a proximal end secured to a shaft 14 and a distal or free end having a handle 16 with a foam pad 18 thereof, to which the user applies a force for muscle exercise and/or rehabilitation. The limb such as a leg, arm or the like of the user can be secured against pad 18 by a strap or like device (not shown), as described fully in copending U.S. patent application Ser. No. 06/907,392, the entire disclosure of which is incorporated herein by reference.

It will be appreciated that, although only one fixture 12 is shown, the present invention envisions the use of any of a plurality of fixtures of differing configurations and lengths, for exercising and rehabilitating different limbs of the user and/or for exercising and rehabilitating the same limb of the user in different positions. However, for purposes of explanation, fixture 12 is shown in FIG. 1 as a rotatable arm.

Shaft 14 is rotatably journalled in a bore 20 of a housing 22, and the opposite end of shaft 14 is connected to the output shaft (not shown) of a gear box 24, for example, having a gear increase ratio of 3:1. Gear box 24 is secured to housing 22 by means of shaft 14 and additional supports 25. The input shaft (not shown) of gear box 24 is connected with the output shaft (not shown) of a particle brake or powdered metal clutch 26, which may be, for example, a magnetic particle brake, Model PSB-120 sold by Dana Corporation, P.O. Box 500, Hagerstown, Ind. 47346 or a magnetic particle clutch sold under the trademark "MAGPOWER" by Magnetic Power Systems, Inc., 1626 Manufacturers Drive, Fenton, Mo. 63026.

In accordance with prior art systems that use dynamic braking of an arm, that is, that use a permanent magnet motor that drives a resistive load across the armature of the motor, the braking action is very non-linear. Thus, as the velocity of the arm goes toward zero, the current goes toward zero, thereby not providing any braking action at small loads. As a result, it is difficult to accurately control movement of the arm at small loads, that is, there is effectively no braking at small loads. In addition, such arrangement can not be used in an isometric mode.

On the other hand, by using a particle brake clutch 26, a linear braking operation is obtained, whereby accurate braking control can be achieved even at small loads. This is because the current through particle brake clutch 26 can be fixed, and the torque is directly proportional to the current, so that accurate control of the torque down to a load of zero can be obtained. Thus, the particle brake clutch can be used to go linearly from zero to maximum torque. Further, a particle brake clutch can be used in an isometric mode.

In order to control particle brake clutch 26 for operation of apparatus 10 in isokinetic, isometric and isotonic modes of operation, the angular speed and angular position of, and torque applied to, fixture 12 are measured. Specifically, strain gauges 28 are mounted on supports 25 for detecting the torque applied to fixture 12, a speed sensor 30 such as a tachometer, optical encoder, pulse pick-up or the like is connected with particle brake clutch 26 to detect the angular speed of fixture 12, and a position detector (not shown but which may be similar to that described in copending U.S. patent application Ser. No. 06/907,392) is provided to produce a position signal corresponding to the angular position of fixture 12. The control circuitry (FIG. 2), and control knobs, ON/OFF switch 31 and the like (FIG. 3), for controlling particle brake clutch 26, are provided in a control box 32 secured to housing 22.

Figure 2:
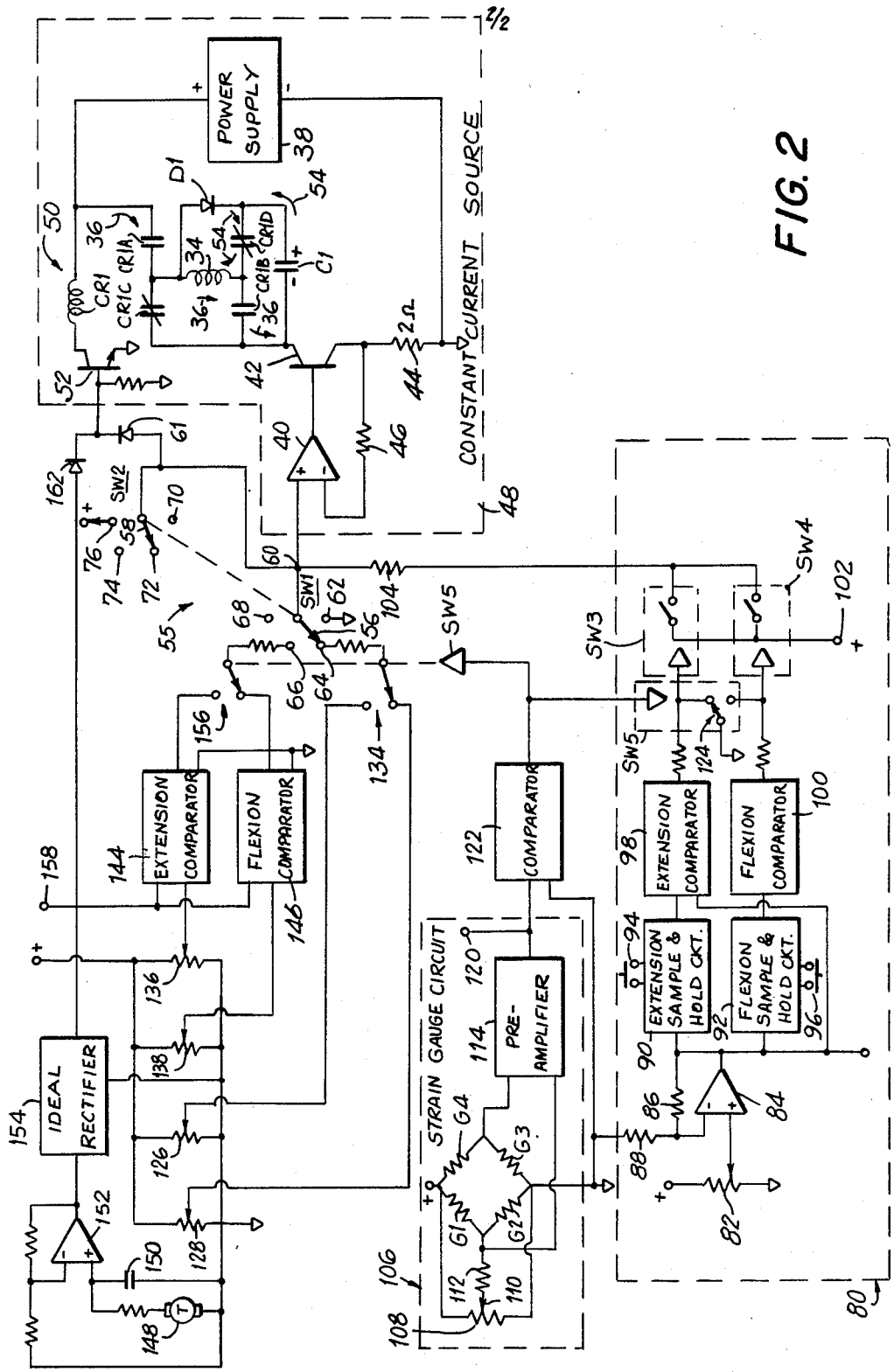
FIG. 2 is a block-circuit wiring diagram of the control circuit for the muscle exercise and rehabilitation apparatus of FIG. 1.

Specifically, as shown in FIG. 2, particle brake clutch 26 is represented by a brake coil 34 through which current is supplied normally in the direction of arrows 36, from a 24 volt power supply 38. The amount of current that is supplied to brake coil 34 is controlled by the output of a high gain 741 operational amplifier 40. Specifically, the output of operational amplifier 40 is supplied to Darlington transistor 42 to turn transistor 42 ON. As a result, the current from power supply 38 travels downwardly through brake coil 34, through the collector-emitter path of transistor 42 and finally through resistor 44 at the emitter of transistor 42. Thus, resistor 44 is connected in series with brake coil 34 and the same current flows through both elements.

The emitter of transistor 42 is also connected through a feedback resistor 46 to the negative input of operational amplifier 40, the positive input being supplied with an input control voltage which will be discussed hereinafter. Thus, the voltage across resistor 44 is fed back to the inverting or negative input of operational amplifier 40. To obtain a balanced operating condition, the voltage across resistor 44 should be equal to the input control voltage supplied to the non-inverting or positive input of operational amplifier 40. As a result, a constant current is maintained through brake coil 34, regardless of, for example, temperature changes and the like in brake coil 34. In this regard, power supply 38, operational amplifier 40, transistor 42, and resistors 44 and 46, constitute a constant current source 48. In the event that the current through resistor 44 varies from the desired current, the voltages at the inputs of operational amplifier 40 will differ, and accordingly, operational amplifier will turn ON transistor 42 either harder or softer, to compensate and bring the circuit back to a truly balanced condition.

Thus, as discussed above, with brake coil 34 of particle brake clutch 26, a linear braking operation is obtained, whereby accurate braking control can be achieved even at small loads. This is because the current through brake coil 34 can be fixed, whereby the torque, and thereby the braking force, is directly proportional to the current through brake coil 34. Thus, if the current through brake coil 34 is controlled, the braking force is also controlled.

One problem with particle brake or powdered metal clutches is that they exhibit hysteresis. Specifically, if a large current is passed through brake coil 34 in one direction, and the current is then reduced to zero, there will be a residual hysteresis effect so that there will be a slight drag in the direction of the current that is then supplied. This is because all magnetic materials have a magnetic memory, and because of the residual magnetic flux in the coil of the particle brake clutch when the current is removed therefrom. Therefore, when reversing direction of fixture 12, it is necessary to overcome the force on fixture 12 due to hysteresis.

To compensate for this, apparatus 10 includes hysteresis compensating means 50 for cancelling out such hysteresis in brake coil 34. Specifically, hysteresis compensating means 50 effectively cancels the flux in the magnetic path due to hysteresis, so as to drive such flux to zero. Hysteresis compensating means 50 includes a high speed relay CR1 that is supplied with current through a transistor 52 when fixture 12 is moving or when apparatus 10 is in the isometric mode. Relay CR1 controls contacts CR1A–CR1D, contacts CR1A and CR1B normally being closed when fixture 12 is moving and being open when apparatus 10 is in the isometric mode. Accordingly, when contacts CR1A and CR1B are closed current from power supply 38 can flow downwardly through brake coil 36, transistor 42 and resistor 44, whereby a controlled braking action is applied to fixture 12 by particle brakeclutch 26. During this current flow, a capacitor C1 is fully charged to the maximum voltage across the brake coil 34. However, as aforesaid, particle brake clutch 26 will exhibit hysteresis.

Thus, in accordance with the present invention, when fixture 12 stops moving when apparatus 10 is in other than the isokinetic or isotonic modes, contacts CR1A and CR1B are open to prevent further current flowing through brake coil 34 in the direction of arrows 36. Instead, contacts CR1C and CR1D are then closed. As a result, the current stored in capacitor C1 flows upwardly through brake coil 34 in the reverse direction shown by arrows 54. It is noted that diode D1 is provided to block the reverse current therethrough so that the reverse current travels in the direction of arrows 54. This reverse current exactly cancels out the hysteresis. If apparatus 10 is in the isometric mode and the user changes apparatus 10 to another mode, initially when such change is made, fixture 12 will not be moving, and capacitor C1 will likewise discharge.

The amount of discharge in the reverse direction is proportional to the magnitude of the current initially impressed across brake coil 34 in the forward direction of arrows 36. Thus, capacitor C1 always senses the maximum voltage across brake coil 34.

In accordance with the present invention, there are four different modes of operation, namely, a set-up mode, an isokinetic (constant speed) mode, an isotonic (constant torque) mode and an isometric mode. In this regard, a double deck mode switch 55 is comprised of two switches SW1 and SW2 ganged together, as indicated by the dashed line connecting switches SW1 and SW2. Both switches SW1 and SW2 have movable arms 56 and 58, respectively, connected to a common junction point 60, which in turn, is connected to the non-inverting or positive input of operational amplifier 40 and to transistor 52 associated with relay CR1, through a diode 61 that permits a signal to pass only from common junction point 60 to transistor 52 and to prevent reverse flow. Although switches SW1 and SW2 are shown as having a movable arm, it is envisioned that semiconductor switches can be used in place thereof.

Arm 56 is movable between four terminals, namely a set-up terminal 62, an isotonic terminal 64, an isokinetic terminal 66, and an isometric terminal 68. In like manner, arm 58 is movable between four terminals, namely a set-up terminal 70, an isotonic terminal 72, an isokinetic terminal 74, and an isometric terminal 76. Terminals 68, 70, 72 and 74 are inactive terminals. A mode knob 78 is provided, as shown in FIG. 3, for changing over switches SW1 and SW2 to the different modes.

The set-up mode is used to set the range of motion limits of fixture 12, that is, the angular extent of travel of fixture 12 in both directions. In this mode, switch SW2 is connected to inactive set-up terminal 70, and switch SW1 is connected to set-up terminal 62, which in turn, is connected to ground. As a result, no voltage is supplied to the non-inverting input of operational amplifier 40, that is, the input to operational amplifier 40 is shorted, whereby no current is supplied to brake coil 34 so that apparatus is rendered inoperable. In other words, fixture 12 can move freely, since there is no resistance from brake coil 34.

A range of motion limit circuit 80 is provided and includes a position potentiometer 82 connected with fixture 12 and which produces a signal proportional to the angular position of fixture 12. This signal is supplied to the non-inverting or positive input of an operational amplifier 84. The output of operational amplifier 84 is connected to the inverting or negative input thereof through a resistor 86, and another resistor 88 is connected between the non-inverting input thereof and ground. Accordingly, operational amplifier 84 functions to scale down the signal from potentiometer 82.

The output of operational amplifier 84 is supplied to an extension sample and hold circuit 90 and a flexion sample and hold circuit 92, each for storing a signal corresponding to the maximum angular limit of fixture 12 in opposite directions, respectively. Specifically, when fixture 12 is moved to the maximum limit of extension, a push button 94 is depressed, which controls sample and hold circuit 90 to store the signal from operational amplifier 84. In like manner when fixture 12 is moved to the maximum limit of flexion, a push button 96 is depressed, which controls sample and hold circuit 92 to store the signal from operational amplifier 84. This is the end of the set-up mode. Thereafter, switches SW1 and SW2 are moved to any of the other terminals for operation of apparatus 10 in the isotonic, isokinetic or isometric mode.

During operation in any of these other modes, the signal from potentiometer 82 which now corresponds to the actual angular position of fixture 12, is supplied to one input of an extension comparator 98 and one input of a flexion comparator 100. The other input to extension comparator 98 is the stored signal supplied from sample and hold circuit 94, and the other input to flexion comparator 100 is the stored signal supplied from sample and hold circuit 96.

Once comparator 98 detects that the voltage from potentiometer 82 (through operational amplifier 84) is equal to or greater than the voltage stored in sample and hold circuit 94, it closes a switch SW3. Switch SW3 is supplied with a high voltage from a voltage source 102. The output of switch SW3 is connected through a resistor 104 to common junction point 60. As a result, when the extension limit is reached, maximum voltage is supplied to the non-inverting input of operational amplifier 40. This results in maximum current being supplied through brake coil 34, whereby a hard braking action occurs to prevent fixture 12 from moving past the set extension limit. If desired, the gain of comparators 98 and 100 can be varied, as in the aforementioned copending U.S. patent applications, to provide a soft or cushioned stop action of fixture 12 at its limits.

In like manner, once comparator 98 detects that the voltage from potentiometer 82 (through operational amplifier 84) is equal to or greater than the voltage stored in sample and hold circuit 96, it closes a switch SW4. Switch SW4 is also supplied with the high voltage from voltage source 102, and the output of switch SW4 is also connected through resistor 104 to common junction point 60. As a result, when the flexion limit is reached, maximum voltage is supplied to the non-inverting input of operational amplifier 40. This results in maximum current being supplied through brake coil 34, whereby a hard braking action occurs to prevent fixture 12 from moving past the set flexion limit.

As discussed previously, strain gauges 28 are provided for measuring the torque on fixture 12. In this regard, strain gauges 28 are represented by a strain gauge circuit 106 in FIG. 2. Specifically, strain gauges G1–G4 are connected in a diamond or bridge configuration with the junction between gauges G1 and G4 being connected to a voltage source of, for example, +15 V, and also to one end of a resistor 108 which forms part of a null potentiometer used for balancing the bridge circuit. The junction between gauges G2 and G3 is connected to a negative voltage source or ground, and to the other end of resistor 108. The junction between gauges G1 and G2 is connected to a movable wiper arm 110 of the potentiometer through a resistor 112. The junction of gauges G1 and G2 and the junction of gauges G3 and G4 form the outputs, and are supplied to respective inputs of a linear pre-amplifier 114. Wiper arm 110 is manually controlled by a knob 116 (FIG. 3) so that the reading on a torque meter 118 (FIG. 3) which is supplied with a torque signal at terminal 120 from the output of pre-amplifier 114 is zero when zero force is applied to fixture 12.

The torque signal from pre-amplifier 114 is supplied to one input of a direction indicating comparator 122, the other input being connected to ground. As a result, depending upon the polarity of the torque signal, comparator 122 produces a signal corresponding to the direction of movement of fixture 12, which is supplied to a switch SW5. Switch SW5 is connected with the inputs to switches SW3 and SW4, and is also provided with a two pole, single throw switch 124, which selectively connects the input of one of switches SW3 and SW4 to ground.

As discussed above, when switch SW3 or SW4 is closed, a large voltage is supplied therethrough to operational amplifier 40 to cause a hard braking action by brake coil 34. However, once these switches are closed, they are maintained closed. Therefore, in accordance with the present invention, after switch SW3 has been closed, fixture 12 is caused to stop. At such time, the input to switch SW4 is connected to ground by switch 124. Thereafter, the user attempts to move fixture 12 in the opposite direction. The change of direction is indicated by the output signal from comparator 122. Thus, switch SW5 changes over switch 124 in accordance with the different polarity of the direction signal from comparator 122 so that switch SW3 is connected to ground through switch 124. This causes switch SW3 to open. At this time, both switches SW3 and SW4 are open. When the flexion limit is reached, switch SW4 closes to stop further movement of fixture 12, and in like manner, upon the user changing the direction of movement of fixture 12, SW5 connects switch SW4 to ground to open the same.

In the isotonic mode of operation, switches SW1 and SW2 are switched to isotonic terminals 64 and 72, respectively. In this mode, the maximum torque that can be supplied to fixture 12 for extension and flexion is set by extension potentiometer 126 and flexion potentiometer 128, which are controlled by extension and flexion control knobs 130 and 132, respectively, on control box 32. The output signals from potentiometers 126 and 128 are supplied to respective terminals of a single throw, double pole switch 134 which is controlled by the direction signal from comparator 122, through switch SW5. Thus, when the direction of movement is in the flexion direction, switch 134 is changed over as shown in FIG. 2, so that the signal from flexion potentiometer 128 is supplied through switch SW1 to the input of operational amplifier 40, whereby a constant current corresponding to a desired flexion resisting torque applied to fixture 12, is supplied through brake coil 34. In like manner, when fixture 12 is moving in the opposite direction in the isotonic mode, switch 134 is changed over to the other terminal thereof so that the signal from extension potentiometer 126 is supplied through switch SW1 to the input of operational amplifier 40, whereby a constant current corresponding to a desired extension resisting torque applied to fixture 12, is supplied through brake coil 34. Thus, the torque is directly proportional to the current through brake coil 34, which current is set by potentiometers 126 and 128.

In the isokinetic mode, switches SW1 and SW2 are connected with terminals 66 and 74, respectively, terminal 74 being inactive. In this mode of operation, the maximum speed that can be achieved by fixture 12 for extension and flexion is set by extension potentiometer 136 and flexion potentiometer 138, which are set by extension and flexion control knobs 140 and 142, respectively, on control box 32. The output from potentiometer 136 is supplied to one input of an extension comparator 144 and the output from potentiometer 138 is supplied to one input of a flexion comparator 146, the other inputs of comparators 144 and 146 receiving a speed signal corresponding to the actual angular speed of movement of fixture 12.

The speed signal is derived from speed sensor 30 which is shown in FIG. 2 as a tachometer 148, the output therefrom being filtered by capacitor 150 connected in parallel therewith. The output signal from tachometer 148 is supplied through an operational amplifier 152 to a conventional ideal rectifier 154 which produces a unidirectional or absolute value speed signal that is supplied to the other inputs of comparators 144 and 146. Thus, comparators 144 and 146 compare the actual speed signal from ideal rectifier 154 with the desired speed signal from potentiometers 136 and 138, respectively. When the actual speed signal is less than the desired or maximum speed signals set by potentiometers 136 and 138, no braking action occurs, that is, fixture 12 can move freely. This is because the output from the comparators 144 and 146 at such time is zero. However, when fixture 12 is moving in extension, and the actual speed signal is greater than the desired speed signal set by potentiometer 136, comparator 144 produces an error signal which is supplied through switch SW1 to operational amplifier 40 to cause a braking action to be applied by brake coil 34 to prevent the speed of movement of fixture 12 greater than the preset speed. In like manner, when fixture 12 is moving in flexion, and the actual speed signal is greater than the desired speed signal set by potentiometer 138, comparator 146 produces an error signal which is supplied through switch SW1 to operational amplifier 40 to cause a braking action to be applied by brake coil 34.

The output signals from comparators 144 and 146 are supplied to respective terminals of a single throw, double pole switch 156 which is controlled by the direction signal from comparator 122, through switch SW5. Thus, when the direction of movement is in the flexion direction, switch 156 is changed over as shown in FIG. 2, so that the signal from flexion comparator 146 is supplied through switch SW1 to the input of operational amplifier 40, whereby fixture 12 is restricted from moving at greater than the preset speed for flexion set by potentiometer 138. In like manner, when fixture 12 is moving in the opposite direction in the isokinetic mode, switch 156 is changed over to the other terminal thereof so that the signal from extension comparator 144 is supplied through switch SW1 to the input of operational amplifier 40, whereby fixture 12 is restricted from moving at greater than a preset speed for extension set by potentiometer 136. Of course, a soft stop or cushioning operation can be obtained by adjusting the gains of comparators 144 and 146 as taught in the aforementioned copending U.S. patent applications.

The output from ideal rectifier 154 is also supplied to an output terminal 158 connected to a velocity meter 160 (FIG. 3) to indicate the actual speed of movement of fixture 12.

The output from ideal rectifier 154 is also supplied through a diode 162 to the base of transistor 52. In this manner, relay CR1 is supplied with an activating signal from ideal rectifier 154 when fixture 12 is moving or from terminal 76 of switch SW2 in the isometric mode to activate hysteresis compensating means 50.

Lastly, in the isometric mode, switches SW1 and SW2 are connected with isometric terminals 68 and 76, respectively, terminal 68 being inactive. Terminal 76 is connected with a source of high voltage, which is supplied to the non-inverting input of operational amplifier 40. This results in a very large current passing through brake coil 34, whereby there is a large braking force applied to prevent the user from moving fixture 12.

Thus, with the present invention, a particle brake clutch 26 is used, whereby linear braking is obtained with accurate braking control, even at small loads. Further, the particle brake clutch 26 can be used in an isometric, isotonic and isokinetic mode of operation. Still further, in accordance with the present invention, hysteresis is counteracted by hysteresis compensating means.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is claimed is:

1. A muscle exercise and rehabilitation apparatus comprising:
   movable fixture means against which an actuating force can be applied;

particle brake clutch means for applying a braking force to said fixture means in linear dependence to current supplied thereto, said braking force being applied in counteracting relation to the actuating force in isometric, isotonic and isokinetic modes of operation;

particle brake control means for controlling the supply of current to said particle brake clutch means so that the latter selectively controls said fixture means to move in one of said isometric, isotonic and isokinetic modes of operation;

mode control means for controlling said particle brake control means to change operation of said apparatus between said isometric, isotonic and isokinetic modes of operation; and compensating means for eliminating effects of hysteresis in said particle brake clutch means in dependence on the amount of braking current previously supplied to said particle brake clutch means.

2. A muscle exercise and rehabilitation apparatus comprising:

movable fixture means against which an actuating force can be applied;

particle brake clutch means for applying a braking force to said fixture means in linear dependence to current supplied thereto, said braking force being applied in counteracting relation to the actuating force;

particle brake control means for controlling the supply of current to said particle brake clutch means so that the latter controls said fixture means to move in at least one of an isometric, isotonic and isokinetic mode of operation; and compensating means for eliminating effects of hysteresis in said particle brake clutch means in dependence on the amount of braking current previously supplied to said particle brake clutch means.

3. A muscle exercise and rehabilitation apparatus according to claim 2; wherein said particle brake control means includes a resistive device connected in series with said particle brake clutch means, and operational amplifier means having a first input supplied with an input control signal and a second input supplied with a signal developed across said resistive device for controlling current supplied to said particle brake clutch means in response to said input control signal.

4. A muscle exercise and rehabilitation apparatus according to claim 2; wherein said particle brake control means includes torque control means for producing an input torque signal corresponding to a desired constant braking force applied to said fixture means by said particle brake clutch means, and current regulating means for controlling current supplied to said particle brake clutch means in response to said input torque signal to control said particle brake clutch means to apply a constant braking force to said fixture means.

5. A muscle exercise and rehabilitation apparatus according to claim 4; wherein said current regulating means includes a resistive device connected in series with said particle brake clutch means, and operational amplifier means having a first input supplied with said input torque signal and a second input supplied with a signal developed across said resistive device for controlling current supplied to said particle brake clutch means in response to said input torque signal so that said particle clutch brake means applies a constant brake force to said fixture means.

6. A muscle exercise and rehabilitation apparatus according to claim 4; wherein said torque control means includes first torque setting means for producing a first input torque signal corresponding to a desired constant braking force applied to said fixture means by said particle brake clutch means during movement of said fixture means in a first direction, and second torque setting means for producing a second input torque signal corresponding to a desired constant braking force applied to said fixture means by said particle brake clutch means during movement of said fixture means in a second direction; and wherein said particle brake control means includes direction sensing means for sensing the direction of movement of said fixture means and for producing a direction signal in response thereto, and switch means for selectively supplying said first and second input torque signals to said current regulating means in response to said direction signal.

7. A muscle exercise and rehabilitation apparatus according to claim 6; wherein said first torque setting means includes a first settable potentiometer which produces said first input torque signal, and said second torque setting means includes a second settable potentimeter which produces said second input torque signal.

8. A muscle exercise and rehabilitation apparatus according to claim 6; wherein said direction sensing means includes torque sensing means for sensing the amount of actuating force applied to said fixture means and for producing a torque signal in response thereto, and comparator means for comparing said torque signal with a reference signal to produce said direction signal in response thereto.

9. A muscle exercise and rehabilitation apparatus according to claim 2; wherein said particle brake control means includes speed control means means for producing an input speed signal corresponding to a desired constant speed of movement of said fixture means, and current regulating means for controlling current supplied to said particle brake clutch means in response to said input speed signal to control said particle brake clutch means to prevent movement of said fixture means at a speed greater than said desired constant speed.

10. A muscle exercise and rehabilitation apparatus according to claim 9; wherein said current regulating means includes a resistive device connected in series with said particle brake clutch means, and operational amplifier means having a first input supplied with said input speed signal and a second input supplied with a signal developed across said resistive device for controlling current supplied to said particle brake clutch means in response to said input speed signal so that said particle brake clutch means prevents movement of said fixture means at a speed greater than said desired constant speed.

11. A muscle exercise and rehabilitation apparatus according to claim 9; wherein said speed control means includes speed sensing means for producing an actual speed signal corresponding to the actual speed of movement of the fixture means, speed setting means for producing a desired speed signal corresponding to a desired constant maximum speed of movement of said fixture means, and comparator means for comparing said actual speed signal and said desired speed signal to produce said input speed signal.

12. A muscle exercise and rehabilitation apparatus according to claim 11; wherein said speed setting means includes first desired speed setting means for producing a first desired speed signal corresponding to a desired constant maximum speed of movement of said fixture means in a first direction, and second desired speed setting means for producing a second desired speed signal corresponding to a desired constant maximum speed of movement of said fixture means in a second direction; said comparator means includes first comparing means for comparing said actual speed signal and said first desired speed signal to produce a first input speed signal, and second comparing means for comparing said actual speed signal and said second desired speed signal to produce a second input speed signal; and said control means includes direction sensing means for sensing the direction of movement of said fixture means and for producing a direction signal in response thereto, and switch means for selectively supplying said first and second input speed signals to said current regulating means in response to said direction signal.

13. A muscle exercise and rehabilitation apparatus according to claim 12; wherein said first desired speed setting means includes a first settable potentiometer which produces said first desired speed signal, and said second desired speed setting means includes a second settable potentiometer which produces said second desired speed signal.

14. A muscle exercise and rehabilitation apparatus according to claim 12; wherein said direction sensing means includes torque sensing means for sensing the amount of actuating force applied to said fixture means and for producing a torque signal in response thereto, and comparator means for comparing said torque signal with a reference signal to produce said direction signal in response thereto.

15. A muscle exercise and rehabilitation apparatus according to claim 11; wherein said speed sensing means includes a tachometer for producing a tachometer signal in correspondence with the actual speed of movement of said fixture means, and ideal rectifier means for producing said actual speed signal in response to said tachometer signal.

16. A muscle exercise and rehabilitation apparatus according to claim 2; wherein said particle brake control means includes isometric control means means for producing a high voltage signal, and current regulating means for controlling current supplied to said particle brake clutch means in response to said high voltage signal to control said particle brake clutch means to prevent movement of said fixture means.

17. A muscle exercise and rehabilitation apparatus according to claim 16; wherein said current regulating means includes a resistive device connected in series with said particle brake clutch means, and operational amplifier means having a first input supplied with said high voltage signal and a second input supplied with a signal developed across said resistive device for controlling current supplied to said particle brake clutch means in response to said high voltage signal so that said particle brake clutch means prevents movement of said fixture means.

18. A muscle exercise and rehabilitation apparatus according to claim 2; wherein said particle brake control means includes range of motion limit means for limiting movement of said fixture means between first and second limits.

19. A muscle exercise and rehabilitation apparatus according to claim 18; wherein
said particle brake control means includes
a resistive device connected in series with said particle brake clutch means, and
operational amplifier means having a first input supplied with an input control signal and a second input supplied with a signal developed across said resistive device for controlling current supplied to said particle brake clutch means in response to said input control signal; and
said range of motion limit means includes
position sensing means for sensing the position of said fixture means and for producing a position signal in response thereto; and
limit control means for supplying a limit signal as said input control signal to the first input of said operational amplifier means in response to said position sensing means when said fixture means is moved to said first and second limits, whereby a large current is supplied to said particle brake clutch means.

20. A muscle exercise and rehabilitation apparatus according to claim 19; wherein said limit control means includes
first storage means for storing a first limit signal corresponding to said first limit of said fixture means,
second storage means for storing a second limit signal corresponding to said second limit of said fixture means,
first comparator means for producing a first switch actuating signal when said said position signal is equal to said first limit signal,
second comparator means for producing a second switch actuating signal when said said position signal is equal to said second limit signal, and
switch means for supplying said input control signal to the first input of said operational amplifier means in response to said first and second switch actuating signals.

21. A muscle exercise and rehabilitation apparatus according to claim 20; wherein said first storage means includes first sample and hold means connected with said position sensing means for sampling and holding the position signal when said fixture means is moved to said first limit, and said second storage means includes second sample and hold means connected with said position sensing means for sampling and holding the position signal when said fixture means is moved to said second limit.

22. A muscle exercise and rehabilitation apparatus according to claim 20; wherein said particle brake control means includes direction sensing means for sensing the direction of movement of said fixture means and for producing a direction signal in response thereto, and said switch means terminates the supply of said input control signal to said operational amplifier means in accordance with a change of direction of said fixture means in response to said direction signal.

23. A muscle exercise and rehabilitation apparatus comprising:
movable fixture means against which an actuating force can be applied;
particle brake clutch means for applying a braking force to said fixture means in linear dependence on a braking current supplied thereto, in counteracting relation to the actuating force;
control means for controlling the supply of braking current to said particle brake clutch means so that the latter controls said fixture means to move in at least one of an isometric, isotonic and isokinetic mode of operation; and hysteresis compensating means for supplying a reverse current to said particle brake clutch means to cancel out hysteresis in said particle brake clutch means in dependence on the amount of braking current previously supplied to said particle brake clutch means.

24. A muscle exercise and rehabilitation apparatus according to claim 23; wherein said hysteresis compensating means includes storage means for storing said reverse current in response to the amount of braking current supplied to said particle brake clutch means during operation in one of said isometric, isotonic and isokinetic modes of operation, and switch means for supplying said reverse current from said storage means to said particle brake clutch means to cancel out the hysteresis in said particle brake clutch means when said fixture means is not moving in a mode other than said isometric mode of operation.

25. A muscle muscle exercise and rehabilitation apparatus according to claim 24; wherein said storage means includes capacitor means for storing a charge corresponding to said reverse current; and said switch means includes detection means for detecting when said fixture means is not moving in a mode other than said isometric mode of operation and producing a switch signal in response thereto, and connection means for connecting said capacitor means to said particle brake clutch means in response to said switch signal to charge said capacitor means with said brake current when said fixture means is moving or when said fixture means is in said isometric mode and to supply said reverse current from said capacitor means to said particle brake clutch means to cancel out the hysteresis in said particle brake clutch means when said fixture means is not moving in a mode other than said isometric mode of operation.

26. A muscle muscle exercise and rehabilitation apparatus according to claim 25; wherein said switch means includes relay means for producing said switch signal in response to movement of said fixture means and operation of said apparatus in said isometric mode; and said connection means includes contact means responsive to said switch signal to charge said capacitor means with said brake current when said fixture means is moving or when said fixture means is in said isometric mode and to supply said reverse current from said capacitor means to said particle brake clutch means to cancel out the hysteresis in said particle brake clutch means when said fixture means is not moving in a mode other than said isometric mode of operation.

27. A muscle exercise and rehabilitation apparatus comprising:

movable fixture means against which an actuating force can be applied;

particle brake clutch means for applying a braking force to said fixture means in linear dependence on a braking current supplied thereto, in counteracting relation to the actuating force;

control means for controlling the supply of braking current to said particle brake clutch means so that the latter controls said fixture means to move in at least one of an isometric, isotonic and isokinetic mode of operation, said control means including torque control means for producing an input torque signal corresponding to a desired constant braking force applied to said fixture means by said particle brake clutch means, speed control means means for producing an input speed signal corresponding to a desired constant speed of movement of said fixture means, isometric control means means for producing a high voltage signal, current regulating means for controlling current supplied to said particle brake clutch means in dependence on said mode switch means and in response to one of:

said input torque signal to control said particle brake clutch means to apply a constant braking force to said fixture means, said input speed signal to control said particle brake control means to prevent movement of said fixture means at a speed greater than said desired constant speed, said high voltage signal to control said particle brake clutch means to prevent movement of said fixture means;

mode switch means for controlling said control means to select operation of said apparatus in one of said isometric, isotonic and isokinetic mode of operation;

range of motion limit means for limiting movement of said fixture means between first and second limits; and hysteresis compensating means for supplying a reverse current to said particle brake clutch means to cancel out hysteresis in said particle brake clutch means in dependence on the amount of braking current previously supplied to said particle brake clutch means.

* * * * *